Patented Aug. 18, 1936

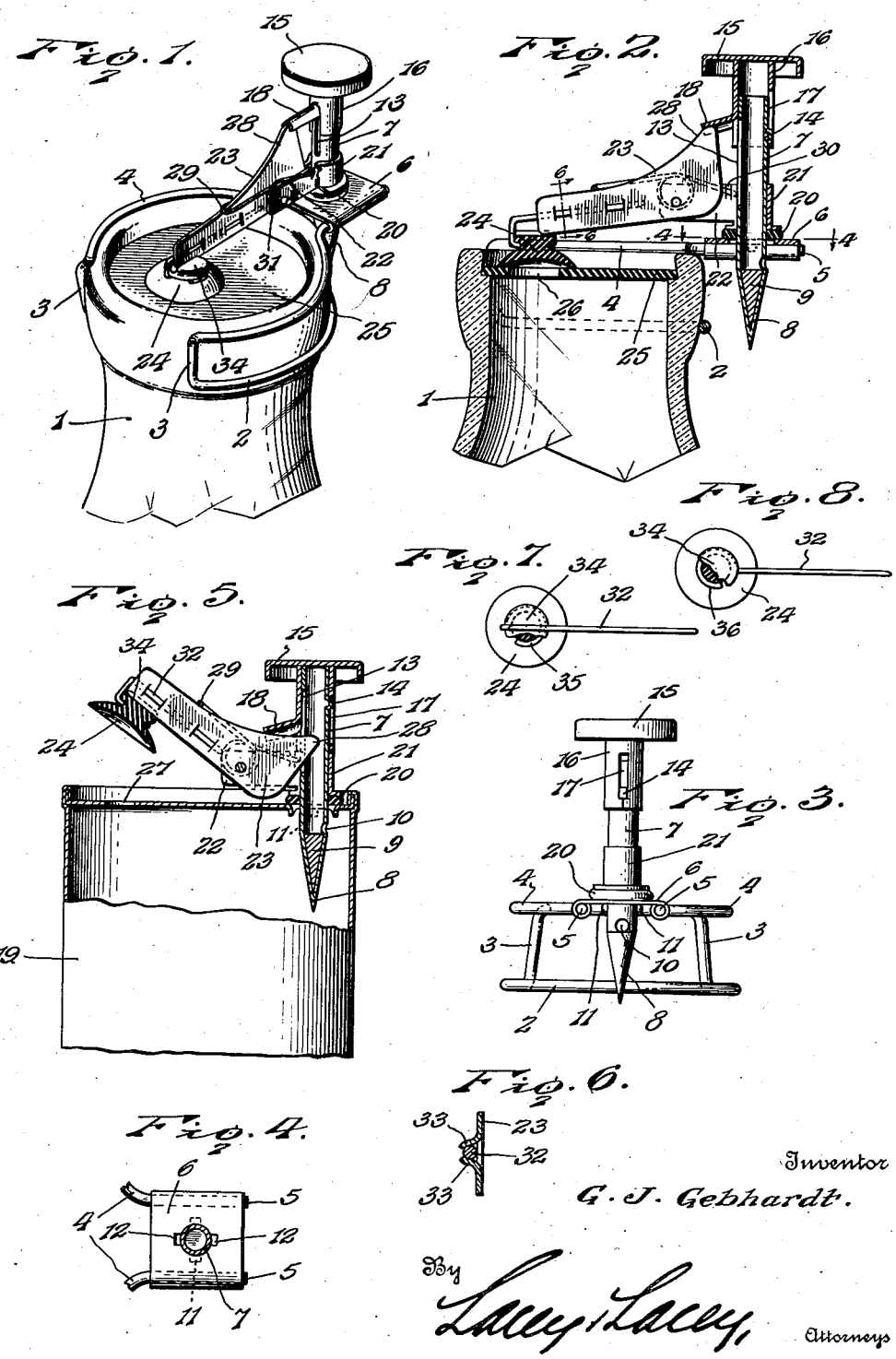

2,051,138

UNITED STATES PATENT OFFICE 2,051,138

CLOSURE FOR CONTAINERS

George J. Gebhardt, Indianapolis, Ind.

Application July 16, 1934, Serial No. 735,480

9 Claims. (Cl. 221—23)

This invention relates to closures for containers which hold milk and other articles of food, and the object is to provide a device which may be applied to any container and which, when in use, will effectually seal the outlet of the container against deleterious influences. It is also an object of the invention to provide a device by the use of which an opening can be made in a hermetically sealed container such as a coffee can and also to so construct said device that it may be mounted in the opening produced and held therein against dislodgement. It is also an object of the invention to provide a device which will include a can puncturing element and a hermetically sealing element carried by the puncturing element. Other objects will appear incidentally in the course of the following description, and the several objects are attained in such a device as is illustrated in the accompanying drawing and the novel features of which will be particularly defined in the appended claims.

In the annexed drawing:

Figure 1 is a perspective view of my improved device showing the same mounted upon the top of a milk bottle.

Figure 2 is a longitudinal section of the same.

Figure 3 is a rear elevation of the device removed from the milk bottle.

Figure 4 is an enlarged detail plan view of the holder employed in the form of the invention shown in Figures 1, 2 and 3.

Figure 5 is a sectional view showing the device applied to the top of a can.

Figure 6 is a detail section on the line 6—6 of Figure 2.

Figures 7 and 8 are detail plan views, partly broken away and in section, showing variations.

When the invention is applied to a milk bottle 1, I employ a clasp consisting of a single strand of wire folded between its ends to form a split ring 2 adapted to pass around the mouth of the bottle and having upturned portions 3 at the ends of the split. The upturned portions 3 merge at their upper ends into circular arms 4 which are disposed above and coaxial with the ring 2 to encircle the mouth of the milk bottle, as clearly shown in Figure 1. The ends of the strand are brought close together and then turned outwardly in parallel relation to form the terminals 5. Around the terminals 5 are rolled or crimped the ends of a metal plate 6 which serves as a connector for the terminals and prevents spreading of the same so that the clasp will firmly engage the mouth of the bottle and, as long as it is undisturbed, will remain in position thereon.

The plate 6 constitutes a base member upon which the closure of my invention is to be mounted.

The device includes a puncturing element or awl which may be conveniently formed of a short tube 7 having its lower end tapered and closed, as shown at 8, and reinforced by a filling block 9 which will hold the shape of the point when pressure is applied thereto to force it through a metal plate to puncture the same. Immediately above the filler block 9 a port 10 is formed in the side of the tube and above said port diametrically opposite lugs 11 are formed on the tube, as shown most clearly in Figure 3. When the awl is forced through a metal plate, the lugs will cause the puncture to have a somewhat elongated form or a circular form with notches, as indicated at 12, at diametrically opposite points of the circle, and if the awl, after being forced through the plate, be turned through an arc of ninety degrees, the lugs will be presented to the underside of the plate at opposite sides of the puncture so that it cannot be withdrawn unless it be turned through another arc of ninety degrees or turned in the reverse direction through the same arc. In the upper portion of the tubular awl there is provided a longitudinal slot 13 in its side, the purpose of which will presently appear, and diametrically opposite the slot 13 a teat 14 is formed by striking up a portion of the metal of the tube. A cap 15 is disposed across the upper end of the tubular awl and a central guiding sleeve 16 depends from said cap and slidably encircles the tube, said stem being formed with a longitudinal slot 17 in its side to engage the teat 14 and thereby hold the cap to a rectilinear path when it is pressed down or permitted to rise and through the engagement of the teat with the slot any rotary movement of the cap and its stem will be transmitted to the awl. At the side of the stem diametrically opposite the slot 17 a projecting lip or tongue 18 is struck therefrom and this lip or tongue is alined with the slot 13. When the awl has been forced through the top of a tin can, shown at 19 in Figure 5, or through the metal supporting plate 6 when the device is applied to a milk bottle, the port or opening 10 will be disposed below the punctured plate and the slot 13 will be above said plate so that air may flow into the container to prevent the formation of a vacuum therein. This venting of the awl is also advantageous when the device is applied to a milk bottle because, although the port 10 will not then admit air into a container, it will admit air into the hollow awl so that there will be no suction holding the cap in its lowered position. A packing ring 20 of rubber or other suitable material is fitted on the awl above the lugs 11 so that when the awl has made a puncture in the top of a tin can and is left in the puncture, the ring 20 will cover the puncture and seal the same so that there can not be any leakage of the contents around the awl.

Fitted upon the awl immediately above the packing ring 20 is a collar 21 which may be soldered in place so as to be anchored and held against movement relative to the awl. From this collar extend arms 22 between which is pivoted a lever 23 which projects beyond the arms and at its outer free end carries a suction cup 24 which is adapted to seat over the pouring opening of the container and seal the same so that dust or other deleterious elements cannot enter the container to contaminate the food therein. It will be understood that the device herein shown and described does not take the place of the usual cap 25 which is commonly applied to milk bottles after they are filled, but that an opening 26 is to be cut into the cap 25 and the suction cup 24 is to be placed over said opening. When the device is applied to a tin can, an opening 27 is formed in the top of the can by forcing the awl through the top and then withdrawing the awl. A second opening is made in the top of the can and the awl is left in the second opening, as shown in Figure 5. The lever 23 is formed on its upper edge with an extension 28 which is adapted to ride in the grooved underside of the projecting tongue 18 and thereby raise the cap 15 when the suction cup is over the pouring opening of the container. When the cap is pressed downwardly the ensuing downward movement of the tongue 18 will cause the lever to rock about its pivot and thereby lift the suction cup from the pouring opening, as shown in Figure 5. When the lever is thus rocked by the downward movement of the cap, the cam projection 28 will pass through the slot 13 which, consequently, serves as a guide to prevent lateral sway of the lever and holds it always in such position that the suction cup will be properly alined with the pouring opening of the container. A torsion spring 29 is engaged at one end over the upper edge of the lever and at its opposite end is fitted to holding lugs 30 on the arms 22, the intermediate portion of the spring being coiled around the fulcrum of the lever, as shown at 31. The spring thus returns the lever and the suction cup carried thereby to their normal closing positions whenever the pressure on the cap 15 is withdrawn and a very close sealing engagement between the suction cup and the closure of the container is thus effected.

The suction cup is fitted on the end of a light rod 32 which is slidably engaged between tongues 33 struck up from the side of the lever, as clearly shown in Figure 6, so that the rod may be adjusted longitudinally of the lever to bring the suction cup into proper position to cover the pouring opening of the container. It is desirable that the cup be located directly under the free end of the lever, as shown in the drawing, but proper adjustment of the device may sometimes carry the cup beyond the lever. If it should be found in applying the device to any particular container that the rod 32 provided therewith is too short to properly support the cup and, at the same time, bring it into proper position over the pouring opening, a longer rod may be substituted therefor and it is contemplated supplying several rods of different lengths with each device so that they may be interchangeably used.

The outer end of the carrying rod may be connected with the suction cup in any approved manner. In Figure 7 I have shown the rod as extending across the knob 34 which is formed on the top of the cup and then bent reversely to form a coil 35 encircling the knob, while in Figure 8 I have shown the rod as extending radially from the coil 36 which encircles the knob.

From the foregoing description, taken in connection with the accompanying drawing, it will be seen that I have provided an exceedingly simple device which may be easily applied to any container and, when applied, may be easily manipulated to cover the pouring opening of the container and thereby preserve the freshness of the commodity in the container for an indefinite period. When applied to tin cans the device is, as shown in Figure 5 and as described, fitted directly to the top of the can but when it is to be mounted upon a milk bottle the clasp shown in Figure 1 is employed to furnish a firm support for the device without any injury to the milk bottle. The device may be very readily stamped out of sheet metal so that it is light and easily manipulated and when applied to a container it will be firmly held thereon so that it will not be easily dislodged and lost.

Having thus described the invention, what is claimed as new is:

1. A device for the purpose set forth comprising an anchoring element, a lever pivotally supported by the anchoring element, a sealing cup adjustably carried by the lever, means mounted on the anchoring element to rock the lever to an inoperative position, and yieldable means acting on the lever to hold it normally in operative position.

2. A device for the purpose described comprising an anchoring element, a lever pivotally mounted upon the anchoring element, a sealing member carried by the lever and adjustable along the lever, yieldable means for acting on the lever to hold the sealing device in operative position, and means mounted on the anchoring element and acting on the lever to rock it to inoperative position.

3. A device for the purpose described comprising an anchoring element, a lever pivotally mounted on the anchoring element, a sealing device, a holder for said sealing device slidably mounted on the lever for movement along the same, yieldable means acting on the lever to hold the sealing device in operative position, and means mounted on the anchoring element to turn the lever to inoperative position.

4. A device for the purpose set forth comprising an anchoring element, a lever pivotally mounted on the anchoring element, a suction cup carried by the lever to seat over an opening, yieldable means acting on the lever to hold the cup in sealing position, and means mounted on the anchoring element and acting on the lever in opposition to said yieldable means.

5. A device for the purpose set forth comprising a tubular anchoring element, a lever pivotally mounted upon the anchoring element and having an extension on its upper side between its pivot and the upper end of the anchoring element, a sealing device carried by the lever, a spring bearing on the lever to hold the sealing device in operative position, and a member slidably mounted on the anchoring element and having a projecting tongue bearing upon the projection of the lever whereby to rock the lever to inoperative position.

6. A device for the purpose set forth comprising a tubular anchoring element having a slot in one side, a plunger mounted on the upper end of said element, a lever fulcrumed upon said element and having a projection at one end engaged by the plunger and adapted to extend through the slot in the anchoring element to be guided thereby, and a sealing device carried by the free end of the lever.

7. A device for the purpose set forth comprising a tubular puncturing element adapted to be forced through a metal plate and provided above its lower end with diametrically opposite lugs whereby a partial turn of the element will cause said lugs to engage under the punctured plate and retain the element therein, the element being provided with an opening below said lugs and with a slot in its upper end portion whereby to permit a circulation of air therethrough, a lever fulcrumed upon the tubular element, and a sealing device carried by said lever to cover a pouring opening.

8. A device for the purpose set forth comprising a clasp formed from a strand of stout wire and comprising upper and lower split rings adapted to partially encircle a milk bottle or the like, a plate fitted on the terminals of the strand of wire and held thereby, a puncturing element adapted to be forced through the plate and be anchored therein, a lever mounted upon said puncturing element, and a sealing device carried by the lever.

9. In a closure for containers, an anchoring element, means carried by the anchoring element for forming openings in a container, a lever carried by said anchoring element, sealing means carried by the lever, and means carried by the anchoring element and lever for normally retaining the sealing means in operative position remote from said element.

GEORGE J. GEBHARDT.